United States Patent [19]
Blackwell

[11] 4,071,312
[45] Jan. 31, 1978

[54] GREEN-YELLOW TO ORANGE MONOAZO PAPER DYES

[75] Inventor: John Blackwell, Kennett Square, Pa.

[73] Assignee: E. I. Du Pont de Nemours and Company, Wilmington, Del.

[21] Appl. No.: 297,957

[22] Filed: Oct. 16, 1972

Related U.S. Application Data

[63] Continuation-in-part of Ser. No. 82,119, Oct. 19, 1970, abandoned.

[51] Int. Cl.$^2$ .................. D21H 1/46; C09B 29/36
[52] U.S. Cl. ............................ 8/7; 260/154; 260/304 P
[58] Field of Search ................. 260/154; 8/7

[56] References Cited

U.S. PATENT DOCUMENTS

| | | |
|---|---|---|
| 2,140,538 | 12/1938 | McNally et al. ............ 260/154 X |
| 2,686,178 | 8/1954 | Gunst ........................... 260/154 |
| 3,071,428 | 1/1963 | Gross et al. ..................... 8/42 |
| 3,101,988 | 8/1963 | Bossard et al. ................... 8/41 |
| 3,426,010 | 2/1969 | Dunworth ....................... 260/158 |
| 3,726,851 | 4/1973 | Litke ............................. 260/154 |

FOREIGN PATENT DOCUMENTS

| | | |
|---|---|---|
| 2,000,639 | 9/1969 | France ........................... 260/158 |
| 1,262,301 | 2/1972 | United Kingdom ............... 260/158 |
| 1,262,302 | 2/1972 | United Kingdom ............... 260/158 |
| 1,262,303 | 2/1972 | United Kingdom ............... 260/158 |

*Primary Examiner*—Charles F. Warren
*Attorney, Agent, or Firm*—James A. Costello

[57] ABSTRACT

Fluorescent paper dyes, green-yellow to orange in color, having the formula

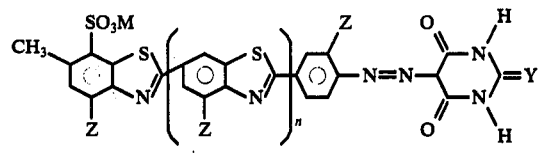

wherein
Y = O or S
Z = H or CH$_3$
n = 0 or 1 and
M = H, Li, Na, K, NH$_4$, or substituted ammonium.

10 Claims, No Drawings

GREEN-YELLOW TO ORANGE MONOAZO PAPER DYES

CROSS-REFERENCE TO RELATED APPLICATION

This Application is a continuation-in-part of copending application Ser. No. 82,119, filed on Oct. 19, 1970 and now abandoned.

BACKGROUND OF THE INVENTION

1. Field of the Invention

This invention concerns fluorescent monoazo paper dyes, green-yellow to orange in color, containing therein barbituric acid unit(s) or a derivative thereof.

2. Description of the Prior Art

U.S. Pat. No. 3,426,010 discloses yellow monoazo paper dyes wherein the coupling components are 3-alkyl-5-pyrazolones which are nonanalogous to the barbituric acid and derivative that are coupling components herein. Further differences between the reference dyes and those of this invention are that the reference dyes are not fluorescent and they are surface active. The dyes taught herein are fluorescent, and they are not surface active. Furthermore, the reference is silent concerning a fluorescent green-yellow dye that produces a bright green shade on paper when mixed with a blue dye.

U.S. Pat. No. 2,686,178 discloses disulfonated disazo dyes that gives violet-brown color shades. The dye molecule is significantly more complex than that of this invention, having a

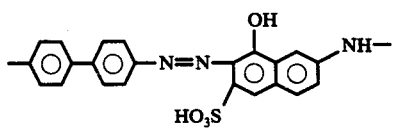

moiety which forms no part of the present invention.

SUMMARY AND DETAILS OF THE INVENTION

The novel dyes have the formula

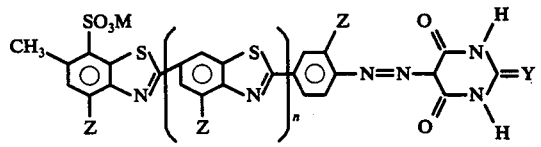

wherein
Y = O or S
Z = H or CH$_3$
n = 0 or 1 and
M = H, Li, Na, K, NH$_4$ or the protonated form of a tertiary lower alkylamine or alkanolamine.

The novel, fluorescent green-yellow to orange dyes have excellent substantivity and tinctorial strength on paper. They also have good bleachability, fastness to light and bleeding and have almost no tendency to cause foaming when agitated in water. It must be understood that the term "dye" or "dyes", depending upon the context, is meant to include mixtures of the novel dyes.

The preferred dye of this invention has the formula

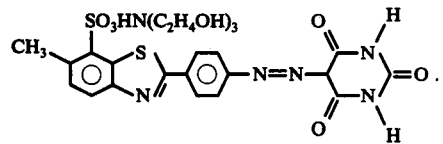

PROCESS

The dyes are prepared by diazotizing an amine of the formula

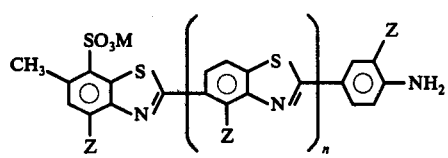

where
n is 0 or 1,
M is a cation, and
Z is H or CH$_3$, and coupling the diazonium salt thus produced to a compound of the formula

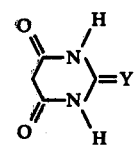

where Y is O or S.

Four representative amines of formula (I) are:

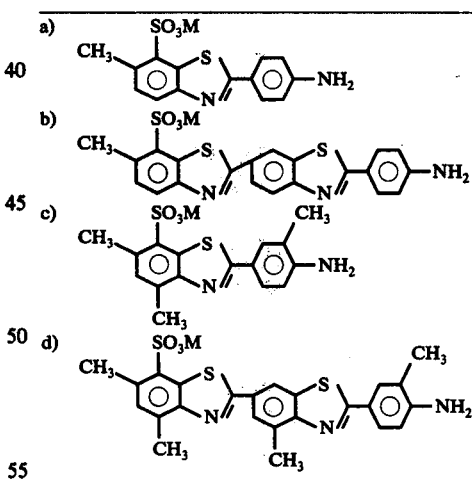

The two coupling compounds (II) are:

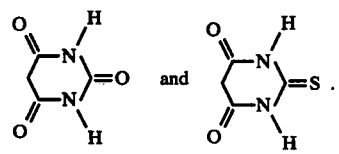

The amines represented by the formula (I) are prepared by heating p-toluidine or 2,4-xylidine with sulfur in the presence of soda ash as described in "Fundamental Processes of Dye Chemistry" by Fierz-David and Blangey, Interscience Publishers Inc., 1949, page 332. The resulting mixture can then be sulfonated and the components separated to give the desired amines. Sulfonation occurs predominantly in the 7-position, as represented in the foregoing formulas, but a minor amount of the 5-sulfo isomer is also formed (Schubert, M., Ann. 558 (1947) 10).

In the preparation of the dyes, a single amine or a mixture of amines can be diazotized to yield, respectively, a single dye or a mixture of dyes. For example, the sulfonated amines represented above as (a), (b), (c), and (d) can be diazotized singly or in any combination and coupled with one or with both of the coupling compounds (II).

Diazotization of the amine(s) can be effected by dissolving or slurrying it in an aqueous alkali at a pH of about 9-10 and adding a 5-10% molar excess of sodium nitrite. The solution or slurry is then added to dilute mineral acid, preferably hydrochloric acid, at 10°-25° C. After addition is complete, the reaction mixture should be acid to Congo Red paper (pH 2.8 or less). The diazo preparation can then be added to a slurry or solution of the coupler at a temperature of 0°-25° C. and at a pH of 3-10 but preferably 4-8. The resulting dye can then be used as a solution or it can be isolated as a solid by spray-drying or by salting out of solution and isolating by filtration.

The nature of the cation associated with the dye can be selected at will by isolating the diazonium salt of the amine, prepared as described above, by filtration and washing thoroughly with water. The solid diazonium compound is then added to a slurry or solution of the coupler in water which contains a compound selected from a basic salt, the hydroxide of lithium, sodium, potassium or ammonium, and one or more organic amines. The organic amines are chosen from tertiary alkylamines such as triethylamines or tertiary alkanolamines such as N,N-dimethylethanolamine, N,N-diethylethanolamine, N-methyl or N-ethyldiethanolamine or triethanolamine. The (lower) alkyl and alkanol groups have up to about 4 carbon atoms.

Since it is desirable, both economically and for ease fo handling, to use the subject dyes as a liquid reaction mass, lithium hydroxide and triethanolamine are the preferred bases since the lithium ion and the protonated triethanolamine cation confer good water solubility on the dyes. Further enhancement of solubility (and thus, more concentrated dye solutions) can be obtained by the addition of urea. By these techniques, concentrations of 7-20% active ingredient are obtained.

DESCRIPTION OF THE PREFERRED EMBODIMENTS

The following Examples further illustrate the invention. Parts and percentages are by weight unless otherwise indicated.

EXAMPLE 1

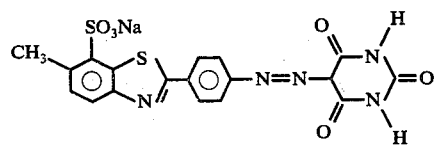

To a solution containing 16 parts of dehydrothio-p-toluidinesulfonic acid, (compound (a) above), and 2 parts of sodium hydroxide in 100 parts of water, 3.9 parts of sodium nitrite were added. The resulting solution was then added to a stirred mixture of 128 parts of concentrated hydrochloric acid and 50 parts of ice. After stirring the yellow slurry for 1 hour at 20° C., excess nitrite was destroyed with urea. The diazo slurry was then added to a stirred mixture of 6.4 parts of barbituric acid, 11 parts of sodium carbonate and 100 parts of water that was cooled to 0°-5° C. After stirring at 0°-5° C. for 2 hours, the solids were collected by filtration, washed with a small amount of water and dried. The yield was 25.9 parts. The crude dye had an absorptivity of 69.2 liters gram$^{-1}$ cm$^{-1}$ at 410 m$\mu$. It produced fluorescent, strong, greenish-yellow shades on bleached sulfite paper and showed good substantivity.

EXAMPLE 2

A mixture containing 65.6 parts of dehydrothio-p-toluidine sulfonic acid, 13.5 parts of potassium hydroxide, 300 parts of water and 42.5 parts of 5N-sodium nitrite solution was added to a stirred mixture containing 50 parts of concentrated hydrochloric acid and 100 parts of ice. After stirring for 1 hour at 20° C., the precipitated diazonium salt was isolated by filtration and washed with water until acid-free. The diazonium salt was then slurried in a small amount of water with 25.6 parts of barbituric acid. A 10% aqueous solution of lithium hydroxide was added dropwise until a constant pH of 4.7 was obtained. The temperature rose from 20° to 38° C. When coupling was complete, 184 parts of urea were added and the mass was heated to 50° C. to ensure solutions of the solids. The red-brown solution produced fluorescent, green-yellow shades on bleached sulfite paper. The dye had good substantivity and fastness to light and good bleachability. The structure of the dye was the same as in Example 1 above, except that lithium instead of sodium was the cation.

EXAMPLE 3

A sample of the dye solution from Example 2 was treated with isopropanol and the precipitated solids were collected by filtration and washed with isopropanol. The solids was reslurried in deionized water, re-isolated by filtration, washed with 50% aqueous isopropanol and dried. The fluorescent yellow solid had an absorptivity of 90.5 liters gram$^{-1}$ cm$^{-1}$ and 412 m$\mu$.

Found: Azo N, 6.1, 6.0.

Calc. for $C_{18}H_{12}LiN_5O_6S_2$: Azo N, 6.02.

EXAMPLE 4

The procedure of Example 2 was repeated, except that triethanolamine was used in place of lithium hydroxide to adjust the pH and no urea was added. The structure of the dye was the same as in Example 1 above, except that the cation was the protonated form of triethanolamine. The concentration of the dye solution was judged spectrally to be 15%.

EXAMPLE 5

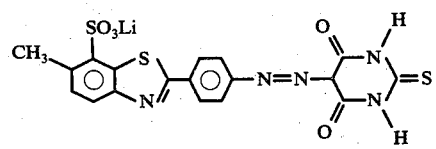

A mixture containing 67.2 parts of dehydrothio-p-toluidine sulfonic acid, 8.5 parts of sodium hydroxide, 300 parts of water and 43.8 parts of 5N-sodium nitrite solution was added to a stirred mixture of 50 parts of concentrated hydrochloric acid and 200 parts of ice. The mixture was stirred for 1 hour and the diazonium salt was isolated by filtration and washed with water. The solid diazonium salt was then slurried with 30.3 parts of 2-thiobarbituric acid in a small amount of water and a 10% aqueous solution of lithium hydroxide was added until the pH was raised to 7.9. Subsequent addition of 95 parts of urea and 60 parts of diethanolamine caused the dye to dissolve completely. The solution was heated to 55° C. and clarified by filtration, yielding a 13% solution of the dye with a pH of 9.9. The dye showed good substantivity on paper tissue, producing fluorescent orange shades thereon.

EXAMPLE 6

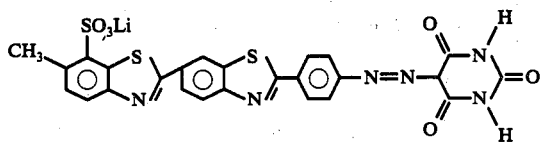

A mixture containing 95 parts of primulene (compound (b) above), 14 parts of potassium hydroxide, 400 parts of water and 42.5 parts pf 5N-sodium nitrite solution was added to a stirred mixture of 50 parts of concentrated hydrochloric acid and 200 parts of ice. After stirring for 2 hours, at 20° C., the precipitated diazonium salt was collected by filtration and washed with water. The diazonium salt was then slurried with 26 parts of barbituric acid in a small amount of water and 10% lithium hydroxide solution was added to raise the pH to 4.5. After stirring for 1 hour, 200 parts of urea were added. The solution was heated to 50° C. and clarified by filtration. The dye solution produced fluorescent yellow shades on paper and displayed good substantivity thereon.

EXAMPLE 7

Beater Dyeing of Paper

One thousand parts of bleached sulfite pulp were dispersed in 18,000 parts of water. One part of the dye prepared in Example 1, 15 parts of rosin size, and 25 parts of Paper Makers Alum (commercial aluminum sulfate, $Al_2(SO_4)_3 \cdot 18H_2O$) were added and the mixture was beater-agitated for about 0.5 hour. Paper sheet was then formed by conventional procedures to yield paper which was dyed an attractive greenish-yellow shade.

The amount of dye employed in the present dyeing procedure may be varied from about 0.05 to 25.0 parts to give lightly tinted to deeply colored dyeings. The percent by weight of bleached sulfite pulp in the initial slurry may vary from 0.025 to about 6%. Likewise, the amount of rosin size and alum used in the process may vary from about 5 to 25 parts, and from about 10 to 35 parts, respectively, or these additives may be omitted. The use of rosin size is omitted when paper stock for use in colored tissue and the like is being dyed with the novel azo paper dyes of this invention.

The beater employed herein is defined in the Van Nostrand Chemists Dictionary, 1953, page 69, as ". . . a tank in which the pulp-water mixture is agitated and cut by means of rotating blades, until the fibers have been separated and reduced in length to the degree desired before they pass to the four-drinier (the actual sheet-forming apparatus)." An extensive discussion of the beater dyeing method is found in the book, Pulp and Paper Manufacture, Volume 2, Preparation of Stock for Paper Making, McGraw-Hill, 1951, pages 492 to 509.

EXAMPLE 8

When the procedure described in Example 7 was repeated, except that rosin size was omitted a greenish-yellow paper was obtained which was colored to the same depth as that obtained when the rosin size was used.

If desired, the novel dyes of this invention may be used for the coloration of paper in the presence of wet strength agents or in the presence of dye retention aids other than size and alum, which agents and aids are well known in the art of paper making. Although dyeings may be performed at pH values of about 7, it is preferred to use additives in the dye liquor which provide a pH of about 6 or below. Ordinary rosin size contains both free rosin and sodium rosinate, and its solution has a pH of about 11–12. A solution of Paper Makers Alum has a pH of about 3. Thus, by mixing these two additives, one readily adjusts the pH of the dye liquor to the desired value of about pH 6, or lower for sized papers.

EXAMPLE 9

Bleaching Process

Five parts of colored paper, prepared as described in Example 7, and 95 parts of water are agitated at ambient temperature. Calcium (or sodium) hypochlorite is added to provide 2% available chlorine, based on the air-dry weight of the colored paper. The slurry is agitated for 5 minutes and then diluted with cold water to provide a 0.5% concentration of paper fiber in the slurry. Paper sheet is then made up according to the manner well known in the art of paper-making to provide paper which is free of color. When deeply colored paper is bleached, the amount of available chlorine should be increased to about 4%.

The embodiments of the invention in which an exclusive property or privilege is claimed are defined as follows:

1. A green-yellow to orange fluorescent dye of the formula

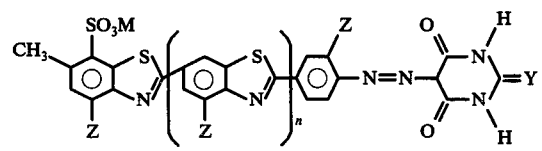

where
Y = O or S
Z = H or $CH_3$
n = 0 or 1 and
M = H, Li, Na, K, $NH_4$ or the protonated form of a tertiary lower alkylamine or alkanolamine.

2. A green-yellow fluorescent dye according to claim 1, said dye having the formula

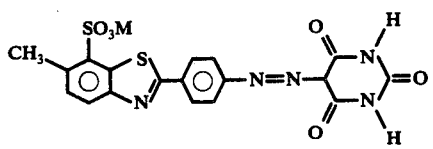

wherein M is selected from Li, Na and protonated tertiary lower alkanolamine.

3. A green-yellow fluorescent dye according to claim 2, said dye having the formula

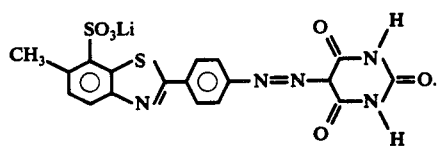

4. A green-yellow fluorescent dye according to claim 2, said dye having the formula

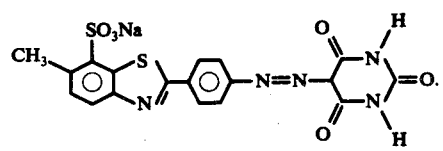

5. A green-yellow fluorescent dye according to claim 2, said dye having the formula

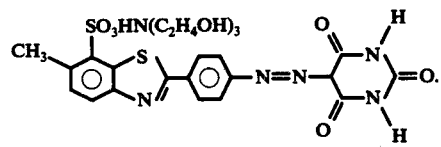

6. A fluorescent dye according to claim 1, said dye having the formula

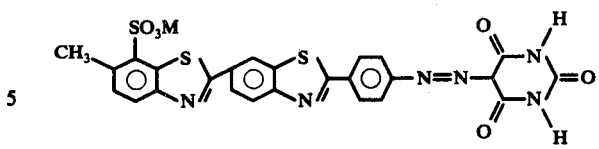

wherein M is selected from Li, Na and protonated tertiary lower alkanolamine.

7. A yellow fluorescent dye according to claim 6, said dye having the formula

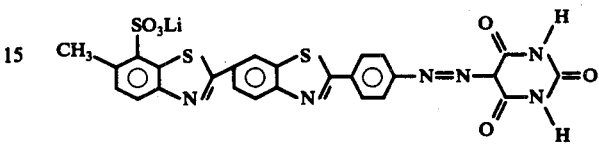

8. A dyestuff as claimed in claim 1 which in its free-acid form has the structural formula:

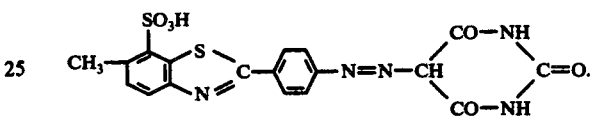

9. Paper dyed with a dye according to claim 1.

10. The paper as claimed in claim 9 wherein the dye in its free-acid form has the structural formula

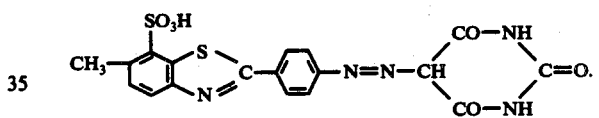

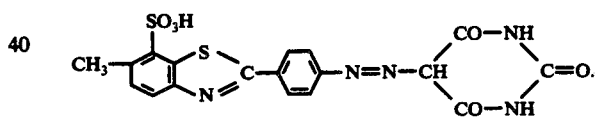

* * * * *

REEXAMINATION CERTIFICATE (1011th)
United States Patent [19]
Blackwell

[11] B1 4,071,312
[45] Certificate Issued Feb. 14, 1989

[54] GREEN-YELLOW TO ORANGE MANDAZO PAPER DYES

[75] Inventor: John Blackwell, Kennett Square, Pa.

[73] Assignee: Mobay Chemical Corporation

Reexamination Request:
No. 90/001,293, Jul. 30, 1987

Reexamination Certificate for:
Patent No.: 4,071,312
Issued: Jan. 31, 1978
Appl. No.: 297,957
Filed: Oct. 16, 1972

Related U.S. Application Data

[63] Continuation-in-part of Ser. No. 82,119, Oct. 19, 1970, abandoned.

[51] Int. Cl.⁴ .................. C09B 29/36; D21H 1/46
[52] U.S. Cl. ........................ 534/728; 8/919; 534/775; 548/156; 548/166
[58] Field of Search .................. 534/775, 728

[56] References Cited
U.S. PATENT DOCUMENTS
3,726,851 4/1973 Litke .................. 260/154

FOREIGN PATENT DOCUMENTS
2142947 3/1972 Fed. Rep. of Germany ...... 534/775

Primary Examiner—Floyd D. Higel

[57] ABSTRACT

Fluorescent paper dyes, green-yellow to orange in color, having the formula

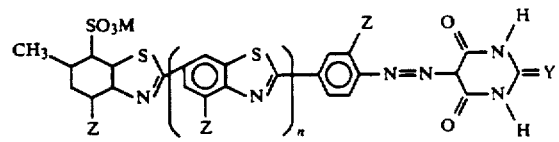

wherein
$Y = O$ or $S$
$Z = H$ or $CH_3$
$n = 0$ or 1 and
$M = H$, Li, Na, K, $NH_4$, or substituted ammonium.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *